Nov. 19, 1940.   R. N. ROWE   2,222,156
SOLDERLESS WIRE TERMINAL
Filed April 18, 1939
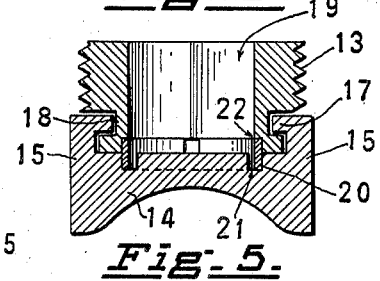
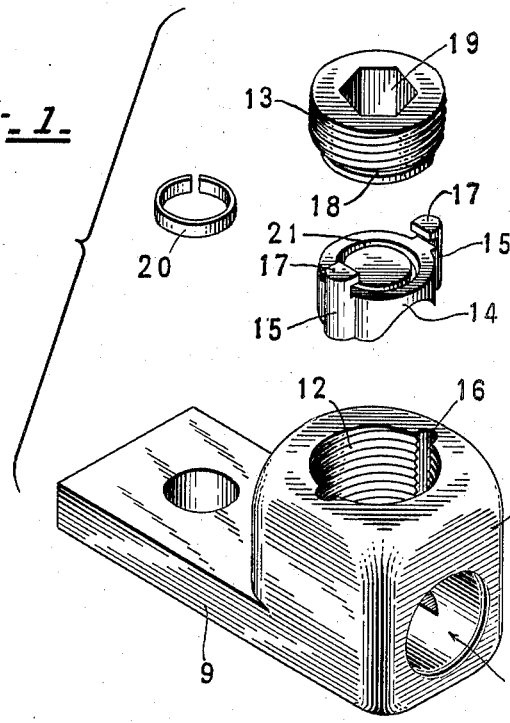
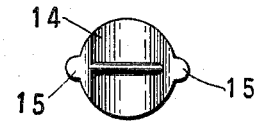
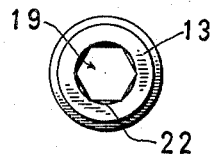
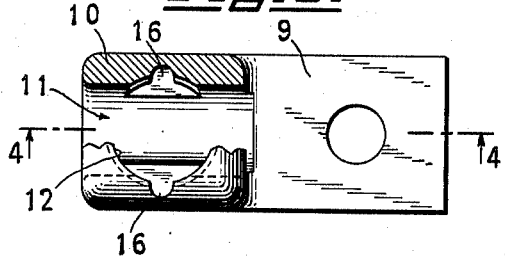
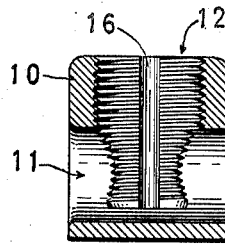
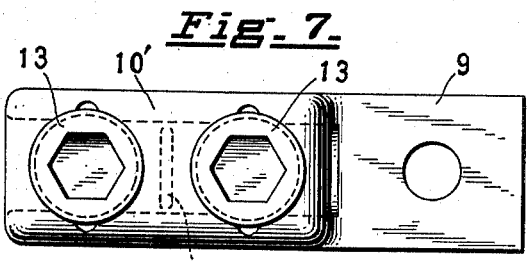
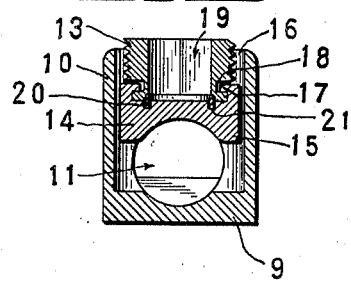
INVENTOR
RAYMOND N. ROWE,
BY
ATTORNEY Patented Nov. 19, 1940

2,222,156

UNITED STATES PATENT OFFICE 2,222,156

SOLDERLESS WIRE TERMINAL

Raymond N. Rowe, Plainville, Conn., assignor to The Trumbull Electric Manufacturing Company, Plainville, Conn., a corporation of Connecticut Application April 18, 1939, Serial No. 268,458

7 Claims. (Cl. 173—269)

My invention relates to solderless clamping devices for wire cables especially of the multiple strand type.

One object is to provide a construction in which the clamping shoe is connected to the screw threaded member so as to form a unit which may be readily attached to or removed from the terminal.

Another object is to provide a rigid and powerful clamp that will not get jammed and which may be readily removed from the terminal even after having been subjected to great wire clamping pressure.

The construction is an improvement upon the type of device of my former Patent No. 2,068,152 of January 19, 1937.

In that device, there is a shoe acted upon by a nut to clamp the conductor in a housing. By my present invention, I interlock the nut and the shoe and guide the shoe in the housing so that it cannot turn but must slide in and out with the clamp nut.

Fig. 1 is an exploded perspective view of a connector involving one form of my invention.

Fig. 2 is a cross sectional view of the parts in their assembled relation on the line 2—2 of Fig. 1.

Fig. 3 is a plan view of the stationary housing of the terminal partially in section.

Fig. 4 is a longitudinal sectional view of the housing on the line 4—4 of Fig. 3.

Fig. 5 is a view of the under side of the shoe.

Fig. 6 is a view of the under side of the clamping nut.

Fig. 7 is a plan view of a terminal having two clamping devices arranged tandem fashion on a single terminal.

Fig. 8 is a cross sectional view upon an enlarged scale of the shoe and nut of my invention.

The main body or housing 9 is adapted to be secured to a support in any suitable manner and has an upstanding portion 10 with an opening or recess 11 for receiving the end of the cable or conductor. A passage 12 which intersects the recess 11 has screw threads to receive the clamping nut 13.

The shoe 14 which presses upon and holds the cable end is provided with projections 15 adapted to slide in grooves 16 in the opposite sides of the passage 12 so as to guide the shoe and prevent it from turning, thus avoiding any jamming which may take place if the shoe were left free in the passage.

Inwardly from the edges of the shoe project the lugs 17 adapted to engage with the opposite sides of the groove 18 in the outer wall of the clamp nut so that the shoe can be retracted with the nut. The groove 18 and the lugs 17 are so constructed that when assembling the parts as a unit, the shoe can be readily fitted to the nut by simply sliding one part sidewise with respect to the other so that the hook-like projections 17—17 on the shoe 14 are positioned in the groove 18 on the nut 13 along the median line of the nut.

When the shoe is inserted into the passage with the nut, the parts are held in the interlocked position. The nut is preferably provided with an opening or recess 19 to receive a suitable tool for turning the nut.

The nut and shoe may be held together by means of a split ring 20 let into a groove 21 in the upper face of the shoe beneath an undercut shoulder 22 in the nut. The nut and the shoe may be assembled as a unit by first engaging the hook-like projections 17—17 on the shoe centrally in the groove 18 on the nut and then forcing the split ring down into the central opening 19 in the nut and when the ring reaches the recesses it will spring outwardly and interlock the parts by seating against the shoulder 22 and the groove 21. In this way the parts are more or less permanently but rotatably secured together. As shown in Fig. 8, groove 21 is of sufficient width to facilitate ready insertion of the ring in assembling the parts and to permit squeezing and contraction of the ring 20 sufficiently to clear the shoulder 22 of the nut 13 when the nut and shoe are to be separated.

In the form shown in Fig. 7, the housing 9 is formed with an elongated upstanding portion 10' sufficient to house two clamping devices in alignment. A rib 23 may be provided between the two clamps so as to afford a further bending or biting action upon the cable and so as to cause the cable to take a sinuous form thereby increasing the gripping power of the clamps. This construction of course provides greatly increased clamping power as well as greatly increased conducting capacity.

I claim:

1. A solderless lug having a base with a cable recess and a screw threaded passage intersecting said cable recess, said last passage having a groove extending lengthwise and along one wall thereof, a nut having a screw threaded engagement in said passage, said nut also having a peripheral groove therein, a clamping shoe having a lateral projection adapted to slide in said first-mentioned groove of the passage and also having a hook-like lug entering said peripheral groove of the nut so as to retain said shoe in engagement with the nut upon rotational and transitional movement of the latter, while allowing the facile separation of said shoe and said nut when the nut and the shoe are withdrawn from the passage, said shoe having sufficient free space on the plane of the lug to permit the shoe to be applied to the nut by the lateral movement of one with respect to the other so that the lug can enter the groove in the nut.

2. A solderless lug having a base with a cable recess and a screw threaded passage intersecting the cable recess and having a longitudinally extending lateral groove, a nut having a screw threaded engagement in said passage and having an external annular groove, a clamping shoe having a lateral projection adapted to slide up and down the lateral groove in said passage and having laterally projecting hook-like lugs at one end thereof and extending into the annular groove in the nut, said lugs being spaced apart circumferentially of the shoe sufficient to provide space for the grooved portion of the nut to be slid between the lugs with the hook ends extending into the annular groove of the nut.

3. A solderless lug including a housing having a cable recess and a screw threaded passage intersecting the cable recess, a clamping shoe slidable in said passage, a clamping nut having screw threaded engagement in the passage and being provided with a peripheral groove remote from its screw threads and hook-like lugs projecting from one end of the shoe and detachably interlocked with said peripheral groove in said nut whereby rotation of the nut moves the shoe in and out of the passage, said lugs being spaced apart circumferentially of the shoe sufficient to provide space for the grooved portion of the nut to be slid between the lugs with the hook ends extending into the annular groove of the nut.

4. A solderless lug including a housing having a cable recess, a screw threaded passage intersecting the cable recess and opposite grooves extending perpendicularly across the recess and longitudinally along the passage to its outer edge, a clamping shoe slidable in the passage and recess, projections extending laterally along the body of said shoe and adapted to coact with said grooves in said housing for guiding the movement of the shoe and a clamping nut having screw threaded engagement in the passage and having a peripheral groove remote from the screw threads and opposite hook-like lugs projecting from one end of the shoe and adapted to interlock detachably with the peripheral groove whereby rotation of the nut moves the shoe in and out of the passage said lugs being spaced apart circumferentially of the shoe sufficient to provide space for the grooved portion of the nut to be slid between the lugs with the hook ends extending into the annular groove of the nut.

5. A solderless lug including a housing having a cable recess, a screw threaded passage intersecting the cable recess and opposite grooves extending longitudinally along the passage to the outer edge thereof, a clamping shoe slidable in the passage and recess, projections along the body of said shoe adapted to coact with said grooves in said passage for guiding the movement of the shoe, a clamping nut having screw threaded engagement in the passage and having a peripheral groove at one end of its body portion remote from its screw threads and integral hook-like lugs projecting from one end and away from the body of the shoe for interlocking with the groove on the clamping nut, said lugs being spaced apart circumferentially of the shoe sufficient to provide space for the grooved portion of the nut to be slid between the lugs with the hook ends extending into the annular groove of the nut.

6. A solderless lug including a housing having a cable recess, a screw threaded passage intersecting the cable recess and a groove extending longitudinally along the passage to the outer edge thereof, a clamping shoe slidable in the passage and recess and having a circular groove in its face portion, a projection extending longitudinally along the side of said shoe and adapted to coact with said groove in the passage for guiding the movement of the shoe, a clamping nut having screw threaded engagement in the passage and having a peripheral groove at one end of its body portion remote from the screw threads, an undercut annular shoulder formed on one end of said nut, an integral hook-like lug on the of the shoe projections and away from the body of the shoe for interlocking with the groove on the clamping nut and a split spring ring having its edges coacting with said undercut annular shoulder and circular groove to assist in holding said nut and shoe together so as to cause them to move substantially together in a longitudinal direction, but so as to prevent relative lateral movement thereof said shoe having sufficient clear space on the level of the lug to permit the shoe to be applied laterally to the nut when outside of the passage, said split ring being small enough with respect to the size of the circular groove in the shoe to permit the ring to be contracted in said groove for the purpose of attaching the shoe to the nut.

7. As an article of manufacture, a device for clamping a wire into an internally threaded terminal, including a wire-engaging shoe having a plurality of undercut hook-like projections extending outwardly from one end thereof and spaced apart circumferentially of the shoe and also having a circular groove in the face thereof from which said projections extend, an externally threaded nut having one face thereof an undercut annular shoulder so shaped as to interfit with the hook-like projections upon said shoe and permit the shoe to be slid on to the nut laterally thereof, and a split expansible ring so shaped as to enter said circular groove on said lug and lock with said undercut annular shoulder on said nut, whereby relative lateral motion of said nut and said lug is restrained, but whereby relative rotational movement of said nut and said lug is freely possible.

RAYMOND N. ROWE.